United States Patent [19]

Boon

[11] 4,158,032
[45] Jun. 12, 1979

[54] CENTRIFUGAL PROCESS FOR PRODUCTION OF POLYURETHANE FOAM

[75] Inventor: Derk J. Boon, Charlotte, N.C.

[73] Assignee: Reeves Brothers, Inc., New York, N.Y.

[21] Appl. No.: 793,286

[22] Filed: May 3, 1977

[51] Int. Cl.[2] .............................................. B29D 27/04
[52] U.S. Cl. ........................................ 264/51; 264/40.3; 264/331; 264/DIG. 84; 425/817 C
[58] Field of Search ................ 264/51, 54, 45.7, 45.1, 264/DIG. 84, 331, 40.3; 260/2.5 BC, 2.5 BD; 259/40, 49, 50, 81 R; 209/199; 261/DIG. 26; 55/178, 228, 421; 425/817 C

[56] References Cited

U.S. PATENT DOCUMENTS

| 831,813 | 9/1906 | Weber | 259/49 X |
|---|---|---|---|
| 1,481,311 | 1/1924 | Appleton | 209/199 |
| 1,530,759 | 3/1925 | Coleman | 209/199 X |
| 2,114,275 | 4/1938 | Murphy et al. | 261/DIG. 26 |
| 2,712,897 | 7/1955 | Kusserow et al. | 233/28 |
| 2,995,346 | 8/1961 | Samples | 260/2.5 BC X |
| 3,052,927 | 9/1962 | Hoppe et al. | 264/45.7 |
| 3,081,487 | 3/1963 | Heffner et al. | 264/54 X |
| 3,108,976 | 10/1963 | Knox | 264/54 X |
| 3,127,255 | 3/1964 | Winslow | 55/178 |
| 3,127,457 | 3/1964 | Di Pinto | 264/54 |
| 3,172,925 | 3/1965 | Preotle | 264/46.5 |
| 3,215,500 | 11/1965 | Bittner | 259/14 X |
| 3,232,709 | 2/1966 | Cole | 260/2.5 BC X |
| 3,251,092 | 5/1966 | Printz | 264/54 X |
| 3,265,786 | 8/1966 | Voelker | 264/54 |
| 3,371,059 | 2/1968 | Rich | 260/29.6 |
| 3,377,411 | 4/1968 | Charvat | 264/45.7 X |
| 3,396,773 | 8/1968 | Alderfer | 264/45.7 X |
| 3,726,951 | 4/1973 | Smith et al. | 264/53 X |
| 3,772,224 | 11/1973 | Marlin et al. | 264/45.1 X |
| 3,786,122 | 1/1974 | Berg | 264/54 X |
| 3,830,760 | 8/1974 | Bengtson | 260/2.5 BD |
| 3,923,937 | 12/1975 | Piccioli et al. | 264/45.7 |
| 3,963,463 | 6/1976 | Huppke | 55/228 X |

FOREIGN PATENT DOCUMENTS

| 1015758 | 1/1966 | United Kingdom | 264/54 |
|---|---|---|---|
| 1333088 | 10/1973 | United Kingdom | 260/2.5 BD |

OTHER PUBLICATIONS

Knox; R. E., "Letdown Valve for Frothing Rigid Foams", Dupont Foam Bulletin: Dupont Hylene, Sep. 12, 1960, one page.
O'Meara, A. L., "Frothed One-Shot Resilient Urethane Foam", Dupont Foam Bulletin: Dupont Hylene, Oct. 22, 1962, pp. 1–8.
Knox, R. E., "Portable Helix Mixer for Urethane Foam", In Journal of Cellular Plastics, Jan. 1965, pp. 150–158.
Bender, Rene J., "Handbook of Foamed Plastics", Libertyville, Ill., Lake Publishing Corp.
Whittington, Lloyd R., "Whittington's Dictionary of Plastics", Stamford, Conn., Technomic, 1968, p. 112.
Smith, Derek R., "Separate by Centrifuge", In Processing, May 1977, pp. 58, 59, 73.

Primary Examiner—Philip Anderson
Attorney, Agent, or Firm—Pennie & Edmonds

[57] ABSTRACT

A centrifuge and centrifugal process are disclosed for prefoaming liquid polyurethane-foam generating reactants prior to introducing the reactants into a mold. A preferred embodiment of the invention is adapted to produce continuously slabs of polyurethane foam of substantially rectangular cross section.

13 Claims, 2 Drawing Figures

CENTRIFUGAL PROCESS FOR PRODUCTION OF POLYURETHANE FOAM

FIELD OF THE INVENTION

The present invention relates to the production of cast polyurethane foams, such as rigid, semirigid, and flexible polyurethane foams.

BACKGROUND OF THE INVENTION

Polyurethane foams are widely used as materials from which articles such as mattresses, seat cushions, and thermal insulators are fabricated. Such polymeric foam materials are ordinarily manufactured by a casting process in which a mixture of liquid polyurethane-foam-generating reactants are deposited in a mold. As used herein, the term "mold" includes both stationary molds for batch casting and translating or otherwise moveable molds for continuous casting. Evolution of a gas causes the reactants to foam. For some foam formulations, the reactants themselves react to evolve sufficient gas; in others, a blowing agent is mixed with the reactants to provide gas evolution. Continued gas evolution causes the foam to expand to fill the mold. The foam, initially a fluid froth (the term "froth" as used by applicant herein means a more viscous, partially-expanded, less dense, prefoamed fluid mixture obtained from the reaction of a liquid mixture of polyurethane foam generating reactants), becomes increasingly viscous as the reactants polymerize, ultimately curing into a polyurethane foam casting shaped by the mold.

Slabs of polyurethane foam approximately rectangular in cross section are conventionally cast in a translating channel-shaped mold. Such molds typically include a belt conveyor forming the bottom of the mold and a pair of spaced-apart, opposing side walls, which can be fixed or translatable at the speed of the conveyor. The mold sides and bottom are generally lined with one or more sheets of flexible-web such as kraft paper or polyethylene film. The sheets of mold liner are ordinarily withdrawn from rolls and continuously translated along the mold channel at the same speed as the belt of the conveyor. Liquid foam-generating reactants are deposited on the mold bottom in a zig-zag pattern from a nozzle positioned above the mold which is reciprocated back and forth across the width of the mold. Typically, as the foam expands, the reactants flow together and merge into a uniform slab of foam.

If fresh reactant mixture is deposited on top of foam generated from previously deposited reactants, the resulting cured foam will have an uneven surface and nonuniform density, which is undesirable for most applications. By continuously translating the mold liner, the reactant mixture is continuously carried away from the pouring area below the pouring nozzle, which reduces the tendency for fresh reactant mixture to cover previously deposited mixture.

To reduce further the tendency of the liquid reactants to flow back under the pouring nozzle and to assist the "zig-zags" of reactant mixture to merge uniformly, it is customary to incline the surface under the nozzle from horizontal so that the bottom liner slopes downward in the direction of translation. However, the angle of inclination of the pouring board cannot be greater than about 4.5° from horizontal for typical flexible polyether polyurethane-foam formulations without causing the reactant mixture to flow forward under previously deposited mixture, which leads to undesirable nonuniform foam. The maximum angle of inclination is different for different foam formulations, such as polyester polyurethane foams.

Problems arise if the mold bottom slopes downward along its entire length. Conventional continuous slab molds are quite long, typically in excess of 60 feet, to provide for the long curing time of the foam. Building a translatable mold of this length inclined from horizontal is significantly more expensive than building a translatable mold of the same length which is horizontal, since, for example, the building housing the inclined mold would be required to have higher than normal ceilings. Moreover, it is especially expensive to provide for changing the angle of inclination of the entire mold to compensate for differing viscosities among the various foam formulations. Thus some continuous slab molds have horizontal belt conveyors for most of the length of the mold bottom, but have relatively short inclined pouring boards located beneath the pouring nozzles. The expansion and rise of the foam generally takes place on the sloping pouring board.

A second reason for providing a pouring board which makes an angle with respect to the belt conveyor concerns the cross-sectional shape of the slab cast in the mold. As the foam expands and rises in the mold, it encounters the sides of the mold. If the mold-side liners are being translated exactly parallel to the mold bottom, the expanding foam experiences as shear force which resists its rise along the sides. This shear force results in a rounding of the top of the slab to form a crown or crest of convex shape, much like a loaf of bread. For most applications such rounded portions are unusable and must be discarded as scrap. Thus the more nearly rectangular the cross section of the slab, i.e., the flatter the top, the more economical is the casting process.

If, over the length the foam travels as it expands, the mold bottom liner and the two mold side liners are translated, not in parallel, but at an angle with respect to one another, the mold side liner can have a velocity component relative to the mold bottom in the direction of the expansion of the foam which can compensate for the shear force which resists the rise of the foam. Guiding the mold bottom liner an inclined pouring board which is located between the side walls of a slab mold and intersects the mold-bottom conveyor at an angle can provide such a compensating velocity component when the foam expansion is carried out over the length of the pouring board and mold-side liners are translated parallel to the mold-bottom conveyor. The angle of intersection which ordinarily leads to polyurethane foam slabs having the most nearly rectangular cross sections is about 10° for typical foam formulations and production conditions. Unfortunately, if the pouring board is sloped 10° from horizontal, freshly deposited reactant mixture tends to flow forward, as discussed above, leading to foam slabs of nonuniform density or otherwise imperfect.

Although it is possible to construct a continuous slab mold with a pouring board inclined from horizontal by an angle of 4.5° and intersecting the belt conveyor at 10°, the belt conveyor in such a case must be inclined upward by an angle of 5.5°. See, for example, my U.S. Pat. No. 3,325,823. As noted above, however, inclined translatable molds are more expensive than comparable horizontal molds.

U.S. Pat. No. 3,786,122 discloses a process for producing polyurethane foam slabs which employs a horizontal, channel-shaped mold having at its forward end an inclined "fall plate" which makes an angle of significantly greater than 4.5° from horizontal. The problem of reactant mixture flowing down the inclined fall plate is obviated by prereacting the reactant mixture prior to introducing it onto the fall plate. The prereacting step is carried out in a trough which opens onto the upper edge of the fall plate. Liquid foam reactants are introduced into the bottom of the trough and the foam which is generated is allowed to expand upwards in the trough and spill over onto the fall plate. The foam continues to expand as it is carried down along the fall plate by a translating bottom sheet. Since the prefoamed reactant mixture exiting the trough is more viscous than the initial liquid reactant mixture, the fall plate can be inclined at a greater angle from horizontal than a pouring board in a conventional polyurethane-foam slab mold.

An additional result of introducing prefoamed reactant mixture into the mold is that relatively high foam slabs can be produced as compared with conventional processes. The height to which foam rises can be thought of as being divided into two components, a first component is the result of the expansion of the foam below a horizontal plane passing through the point at which the reactants begin to foam and is determined by the decline and length of the pouring board, and a second component is the result of the rise of the foam above the horizontal plane.

Economies result from producing high slabs since, the thicker the foam slab, the less is the loss from discarding the rind which generally coats polyurethane foam castings. With a conventional slab mold, if the rate of introduction of reactant mixture is kept constant and the rate of translation of the mold liner is reduced, the height of the foam slab tends to increase since more foam-generating reactant is deposited per unit length. However, since the rate of gas evolution remains essentially constant, the rising of the foam takes place over a shorter linear distance, in addition to rising to a greater height, which gives the rising foam a steeper slope. If the rate of translation is slowed sufficiently, this slope becomes so steep that the expanding foam, particularly the youngest and most fluid portion, becomes unstable and tends to slip and shift, which results in cracks and other imperfections in the cured foam.

This problem of instability of rising foam is reduced in the process of the U.S. Pat. No. 3,786,122 by introducing into the translating mold prefoamed reactant mixture which is sufficiently viscous as to be able to sustain a relatively steep slope of the pouring board as it completes its expansion. Thus the first component which determines the height of the foam can be increased. In addition to permitting higher foam slabs to be cast by reducing the translation speed of the mold liner, this process permits the use of slab molds shorter than those of conventional processes, since the slab moves a shorter distance during the curing time.

In practice, however, the process of the U.S. Pat. No. 3,786,122 suffers from a number of drawbacks. The prefoamed reactant mixture introduced into the mold must be quite fluid, since the foaming mixture rising in the trough must, by gravity flow, spill over a weir structure and onto the fall plate of the mold. Thus prefoamed reactants which are too viscous to flow freely cannot be used. This limits the height of slabs which can be obtained by the process.

Additional problems attend the use of the open trough of the U.S. Pat. No. 3,786,122. For example, changing the width of the trough is difficult because foam deposits interfere with reestablishing fluid-tight seals. Moreover, the trough opening is subject to partial blockage by deposits of cured foam along the back and sides where the flow of prefoamed reactant mixture stagnates. Such deposits break free from time to time and are swept over the weir into the rising foam, thereby causing objectionable nonuniformities in the foam slab.

A further difficulty is encountered when air bubbles are introduced into the bottom of the trough with the liquid reactants. These air bubbles generally remain entrained in the foam, leading to voids and other defects in the cured material.

SUMMARY OF THE INVENTION

Speaking broadly, the present invention relates to a centrifuge and centrifugal process for prefoaming liquid reactants to prepare polyurethane-foam froths (the term "froth" as used by applicant herein means a more viscous, partially-expanded, less dense, prefoamed fluid mixture obtained from the reaction of a liquid mixture of polyurethane foam generating reactants) which can be deposited in a mold to complete their expansion and curing. In particular, the centrifuge of the present invention includes a container having a side wall and a first end wall which is rotatable about an axis. The centrifuge also includes means for introducing polymeric-foam-generating liquid reactants into the interior of the container as it rotates and directing the reactants to the radially-inward surface of the side wall. The first end wall is provided with an opening concentric of the rotation axis for discharging froth generated in the interior of the container. The interior of the container is preferably clear of nonrotatable obstructions which would collide with rotating froth and thus interfere with its generation. The centrifuge further includes means for rotatably supporting the container and means for rotating the container about the rotation axis.

Liquid foam-generating reactants in the rotating container are subjected to a centrifugal force which impels the liquid against the inner side wall of the container. The foam froth generated by the reactants, being less dense than the liquid reactants themselves, tends to "rise" in a radially-inward direction against the centrifugal force and towards the rotation axis. Thus, prefoamed froth can be withdrawn from axial regions of the centrifuge for depositing in a mold.

By increasing the rotational velocity of the centrifuge, the centrifugal force against which the froth must "rise" is increased, which compresses the froth and distributes the reactants more evenly along the inner wall of the container. The time required for the foam to expand to the discharge port is thus lengthened. The longer the froth resides in the centrifuge, the more viscous it is when discharged. Thus the viscosity of the froth can be conveniently and continuously varied in preferred embodiments of the invention by varying the rotational velocity of the centrifuge.

Embodiments of the present invention having a centrifuge container which is fully enclosed and pressure tight are particularly adapted to produce froths of high viscosity. The interior of the container can be maintained under pressure to discharge the froth from the container and propel it to a mold. If rectangular foam slabs are to be cast, the use of a viscous froth in a translating slab mold permits thick slabs to be produced at a low translation speed of the mold.

An additional feature of the present invention is that centrifugation rids the liquid reactants of air bubbles. Subjecting the reactants to a centrifugal force causes entrained bubbles to rise to the surface against the centrifugal force before the foaming of the reactants begins. In this way cured foam substantially free of voids caused by air bubbles can be produced.

Froth from centrifuges of the present invention can be cast in continuously translating molds to manufacture foam castings of rectangular, round, or other cross section. For example, the froth can be deposited by a reciprocating nozzle on a pouring board in a translating slab mold having a horizontal belt conveyor. Because of the viscosity of the froth, the pouring board can be inclined at a relatively steep angle with respect to horizontal and the speed of translation of the mold maintained at a relatively low value. In this way thick polymeric foam slabs having a substantially rectangular cross section can be conveniently produced.

Froth from the process of the present invention can also be deposited on a surface, for example, the surface of a fabric, to coat the surface with a layer of foam.

The froth from the centrifugal process of the invention can also be cast in a fixed mold. Since the froth has been partially expanded, the mold walls have a limited effect in inhibiting the final rise of the foam, as compared to foam which undergoes its entire expansion in the mold. Moreover, the rind which generally coats polymeric foam castings is generally thinner and more nearly homogeneous with the bulk of the foam when a prefoamed froth is cast, since the further the foaming reaction has progressed before reactants contact the sides of the mold, the less susceptible the reactants contacting the mold are to temperature differences between the sides of the mold and the bulk of the foam.

The centrifuge of the present invention is a practical foam generator which is inexpensive and simple to construct. Furthermore, maintenance presents little problem since there is substantially no buildup of residuals even after prolonged operation of the centrifuge.

Unlike the trough and weir apparatus of the prior art discussed above, the centrifuge of the present invention permits discharge of froth from a point. Thus the froth can be conveniently directed into a variety of types of molds for casting or onto surfaces for coatings. In addition, the viscosity of the froth and the diameter of the largest foam cells can be conveniently controlled by varying the retention time of the froth within the centrifuge and the rotational velocity.

BRIEF DESCRIPTION OF THE DRAWINGS

Several preferred embodiments of the invention are described below with reference to the accompanying drawings, in which.

DETAILED DESCRIPTION OF THE PREFERRED EMBODIMENTS

Figure 1:
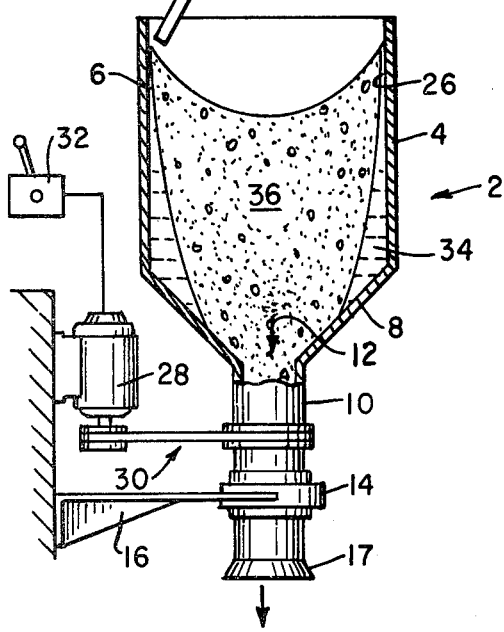
FIG. 1 is an elevation in partial section of a centrifuge of the present invention.

Referring now to FIG. 1, a centrifuge for prefoaming polyurethane foam includes a container 4 having a cylindrical side wall 6 and a first end wall 8 of a truncated conical shape. The container 4 is substantially axially symmetric about an axis to facilitate rotation about the axis. Also symmetric about the axis of rotation is a drive tube 10 which is joined at a first end to the first end wall 8 of the container 4 along a perimeter of a froth-exit port 12 in the first end wall 8 concentric of the rotation axis. The drive tube 10 is mounted in a rotary support bearing 14, which in turn is attached to a support bracket 16 which supports the container 4 and orients the axis of rotation in a vertical direction. An opening in a second end of the drive tube 10 serves as a froth-discharge port 17.

Reactants for generating polyurethane foam are mixed in a mixing head 18. Alternatively, the reactants can be mixed in the container 4. A first and a second mixing-head inlet tube 20 and 22 are provided for introducing the reactants into the mixing head 18. A centrifuge inlet tube 24 directs the mixture from the mixing head 18 to a radially-inward surface 26 of the container 4. The inlet tube 24 is preferably positioned so as not to collide with the rotating froth 36 generated within the container 4. If the rotating froth 36 collides with a nonrotating obstruction, air bubbles tend to become entrained in the froth, leading to voids and nonuniformities in the resulting foam. Thus the interior of the container 4 is preferably clear of such obstructions.

The centrifuge 2 is powered by a variable-speed electric motor 28, which rotates the container 4 by means of a pulley drive 30 attached to the drive tube 10. A motor-speed controller 32 of conventional design determines the speed of the motor 28, which in turn determines the speed of rotation of the container 4.

Reactants for generating a polymeric foam can be prepared and centrifugally processed to form a froth for depositing in a mold as follows. The container 4 is rotated about its axis by the electric motor 28. Reactants for producing a polymeric foam are metered into the mixing head 18 through the first and second mixing head inlet tubes 20 and 22. A blowing agent may also be incorporated in the reactant mixture. The reactant mixture is directed from the mixing head 18 to the radially-inward surface 26 of the rotating container 4 by the centrifuge inlet tube 24. Since the centifugal force is greatest in the vicinity of the radially-inward surface 26 of the rotating container 4, the liquid reactant mixture 34 tends to lie along this surface. After a short time the reactant mixture begins to generate gas and form a fluid froth 36. The froth, being less dense than the liquid reactant mixture, expands against the centrifugal force in a generally radial direction. The froth 36 flows from the container 4 through the froth exit port 12 under the influence of gravity. Since the opening of the froth exit port 12 is located radially inwardly from the inner surface 26 of the container 4, froth is withdrawn from the container from a region separated from the region of maximum centrifugal force. A mold can be positioned under the centrifuge 2 to receive the froth flowing from the froth-discharge port 17.

Changing the rate of rotation of the container 4 changes the viscosity of the foam. Increasing the rate of rotation increases the centrifugal force on the froth and reactant mixture. Consequently a longer time is required for the froth to expand to the froth exit port 12 as explained above. Thus, the froth, being older, is more viscous.

Figure 2:
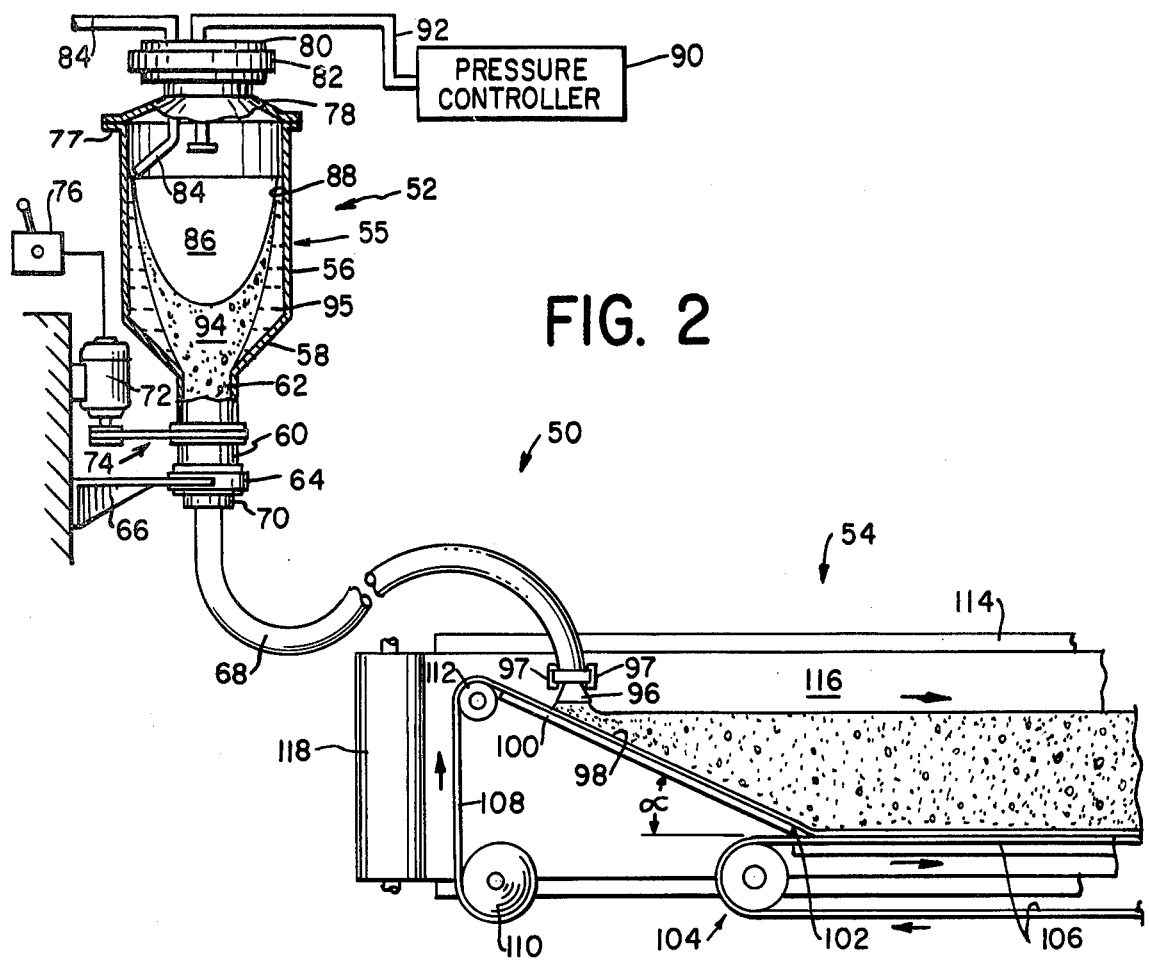
FIG. 2 is an elevation in partial section of an embodiment of the present invention for producing slabs of polymeric foam of substantially rectangular cross section.

Referring now to FIG. 2, an apparatus 50 for producing slabs of polymeric foam substantially rectangular in cross section includes a centrifuge 52 and a continuous slab mold 54. The centrifuge 52 includes a container 55 having a cylindrical side wall 56 and a first end wall 58.

A drive tube 60 is joined at the first end wall 58 of the container 56 along a perimeter of a froth exit port 62 in the first end wall 58. The drive tube 60 is connected to a first rotary joint 64, which in turn is secured to a support bracket 66. A flexible discharge conduit 68 is coupled to the first rotary joint 64 by flange 70 which is affixed to a first end of the conduit 68. The first rotary joint 64 is fluid tight and permits the drive tube 60 to rotate while the flange 70 remains fixed. The interior of the flexible conduit 68 communicates with the interior of the container 56 through a passageway (not shown) in the first rotary joint 64 and the interior of the drive tube 60.

A variable speed electric motor 72 rotates the container 56 by way of a pulley drive 74. The speed of the motor 72 and hence the speed of rotation of the container 56 is set by a motor speed controller 76.

Attached to the cylindrical side wall 56 of the container 55 by a flange 77 is a second end wall 78. To permit access to the interior 86 of the container 55, the second end wall 78 is preferably removable. The second end wall 78 has an opening therethrough (not shown) concentric of the axis of rotation which is sealed by a header 80 connected to the second end wall 78 by a second rotary joint 82. The second rotary joint 82 is substantially pressure tight and permits the container 55 to rotate with the header 80 remaining fixed. A centifuge inlet tube 84 passes through the header 80 for introducing a reactant mixture into the interior 86 of the container 55 and directing it to a radially-inward surface 88 of the side wall 56. The outer surface of the inlet tube 84 is sealed to the header in a pressure-tight manner. The centifuge inlet tube 84 is connected to a mixing head (not shown) in the same manner as the inlet tube 24 shown in FIG. 1 is connected to the mixing head 18.

The rotation of the container 55 causes reactant mixture 95 to be impelled to the radially-inward surface 88 of the side wall 56. The froth 94 generated by the reactant mixture 95 expands generally radially inwardly towards the rotation axis.

The pressure of a gas atmosphere in the interior 86 of the container 55 is controlled at a predetermined value by a conventional gas pressure controller 90 which communicates with the interior 86 through a pressure-controller conduit 92 which passes through the header 80. Maintaining the interior 86 of the container 55 at a pressure greater than the ambient atmospheric pressure propels froth 94 from the interior 86 through the flexible conduit 68.

The flexible conduit 68 directs froth from the interior of the container 55 to the slab mold 54. A nozzle 96 secured to a second end of the flexible conduit 68 is positioned above a pouring surface 98 of a pouring board 100. The nozzle 96 can be reciprocated crosswise of the slab mold 54 across the width of the mold by reciprocation means which includes support rails 97 and a reciprocating-nozzle drive (not shown). A first edge 102 of the pouring board 100 is adjacent to a surface of a belt conveyor 104 which forms a mold bottom surface 106. The mold bottom surface 106 is substantially horizontal when the mold 54 is in a horizontal rest position, the preferred position.

A mold-bottom liner 108 made of a flexible web such as kraft paper is supplied from a roll 110 and is guided over a roller 112 down along the pouring surface 98 of the pouring board 100, across the first edge 102 of the pouring board 100 and onto the mold-bottom surface 106 of the belt conveyor 104. Thus the mold-bottom liner 108 is continuously translated as the belt conveyor 104 is translated.

A first mold side wall 114 is positioned perpendicular to and adjacent to the mold bottom surface 106. A first mold-side liner 116, also made of a flexible web such as kraft paper, is positioned flat against the first mold side wall 114. A second mold side wall and mold side liner (not shown) are positioned adjacent to the mold-bottom surface 106 spaced apart from and opposing the first mold side wall 114 and first mold-side liner 116 in a mirror-image relationship. The first and second mold-side liners and the mold-bottom liner 106 thus define a channel-shaped mold for casting foam slabs having a substantially rectangular cross section. Means are provided for guiding and translating the first mold-side liner 116 and the second moldside liner in a linear direction parallel to the direction of translation of the mold-bottom liner 108 when it lines the mold bottom surface 106 of the belt conveyor 104. For example, the mold-side liners can be guided and translated by making the mold side walls vertically-oriented belt conveyors. The rates of translation of the two mold side liners in the direction of the mold bottom liner should equal the rate of translation of the belt conveyor 104.

The pouring surface 98 of the slab mold 54 is substantially planar and makes an angle $\alpha$ with the mold-bottom surface 106. Since a prefoamed froth is deposited on the pouring surface 98, the angle $\alpha$ may be substantially greater than the maximum angle which conventional pouring surfaces for receiving liquid foam-generating reactants make with horizontal. In a preferred embodiment of the slab mold 54, for example, the angle $\alpha$ can be approximately 10° for a particular typical foam formulation, for which the corresponding maximum angle would be only about 4.5° in a conventional process. The angle of inclination $\alpha$ of the pouring surface 98 can be changed to meet changes in the viscosity of the froth.

Although a planar pouring board 100 is illustrated in FIG. 2, in certain applications it may be advantageous to employ a pouring board having several planar segments, each planar segment being inclined at a different angle from horizontal. Alternatively, a curved pouring board could be used if desired.

EXAMPLES

The following examples are illustrative of the ease with which polyurethane foam may be produced in accordance with the centrifugal process of the invention:

EXAMPLE I

A slab of polyurethane foam of square cross section was cast continuously using a centrifuge for prefoaming the reactants.

The centrifuge was configured generally as the centrifuge illustrated in FIG. 2. The centrifuge container had a cylindrical portion which had an inside diameter of about 5½ inches and was about 6 1/16 inches deep. The volume of the centrifuge container, less the volume occupied by the centrifuge inlet tube, was about 168 cubic inches. The top of the centrifuge was connected through a rotary joint to a regulated source of compressed air which maintained the pressure within the container at between about 5 and 10 inches of water greater than ambient pressure. The centrifuge was rotated by an electric motor at a speed in the range of from about 140 to about 170 r.p.m. The froth exit port of the centrifuge was about 1 inch in diameter and was connected by a rotary joint to a froth discharge pipe which was about 18 inches long 1 inch in diameter. The centrifuge was positioned directly over a pouring board of a mold so that froth discharged from the exit pipe dropped to the pouring board. The following formulation was used:

| Ingredient-Component A | Parts by Weight |
|---|---|
| "Polyol 3140" (Dow Chemical Co.) | 100.00 |
| "Surfactant DC 198" (Dow Corning Corp.) | 1.00 |
| Stannous Octoate (Metal & Thermite T-9) | 0.25 |
| Water | 4.00 |
| Dimethylethanol Amine (Pennwalt #272) | 0.25 |
| | 105.50 |
| Ingredient-Component B | |
| TDI 80/20 "Mondur TD-80" (Mobay Chemical Co.) | 48.39 |

The ingredients of component A were premixed and pumped as one stream into a conventional mixing head. Component B was separately pumped into the mixing head, where the two components were mixed. The combined feed rate of components A and B was approximately 20 pounds per minute. The mixing head was connected to the centrifuge by a hose which was about 6 feet long and had an inside diameter of ¾ inch.

The mold was channel-shaped with side walls extending parallel to one another, spaced about 18 inches apart. The pouring board was made up of three planar segments: the first was inclined 12° from horizontal and extended for about 30 inches from the pour point; the second section declined at an angle of 2.4° for about 24 inches; and the third section declined 13.2° at an angle of 48 inches. The mold was lined with kraft paper which was translated at a speed in the range of from about 4½ to about 5 feet per minute.

The polyurethane foam produced was of good quality and had a density of about 1.58 pounds per cubic foot. The slab was substantially square in cross section, about 18 inches on a side, and had a substantially flat top.

EXAMPLE II

A series of samples of cast polyurethane foam were prepared to determine the effect of the centrifuge rotational velocity and residence time on the properties of the resultant foam.

Five runs, designated as runs 1 through 5, were carried out using the following formulation:

| Ingredient-Component A | Parts by Weight | Grams |
|---|---|---|
| "Polyol 3140" (Dow Chemical Co.) | 100.00 | 200.0 |
| "Surfactnat DC 198" (Dow Corning Corp.) | 1.00 | 2.0 |
| Water | 4.00 | 8.0 |
| Dimethylethanol Amine (Pennwalt #272) | 0.25 | 0.5 |
| Stannous Octoate (Metal & Thermite T-9) | 0.25 | 0.5 |
| | 105.50 | 211.0 |
| Ingredient-Component B | | |
| TDI 80/20 "Mondur TD-80" (Mobay Chemical Co.) | 48.39 | 96.78 |

Two additional batches for runs 6 and 7 were prepared with the formulation below, which had an increased concentration of dimethylethanol amine catalyst to decrease the reaction time.

| Ingredient-Component A | Parts by Weight | Grams |
|---|---|---|
| "Polyol 3140" Chemical Co.) | 100.00 | 200.0 |
| "Surfactant DC 198" (Dow Corning Corp.) | 1.00 | 2.0 |
| Water | 4.00 | 8.0 |
| Dimethylethanol Amine (Pennwalt #272) | 1.00 | 2.0 |
| Stannous Octoate (Metal & Thermite T-9) | 0.20 | 0.4 |
| | 106.20 | 212.4 |
| Ingredient-Component B | | |
| TDI 80/20 "Mondur TD-80" (Mobay Chemical Co.) | 50.00 | 100.0 |

For each run, the quantities listed of components A and B were mixed with a small air mixer for 7 seconds. The premixed reactants were subsequently centrifugally processed in a centrifuge having a single opening at the top for introducing the foam generating reactants and withdrawing the resultant froth. The interior of the centrifuge container had the shape of two truncated circular cones joined base-to-base. The interior of the container was 3⅛ inches in diameter at the closed end, widened to 5 inches, and then narrowed to 2 inches at the opening. The interior space had an axial length of 8⅛ inches, with the widest portion being located 1½ inches below the opening.

The premixed reactants were rotated at measured rotational velocities and for measured lengths of time. The rotational velocities and residence time in the centrifuge are set forth in Table I below. Runs 1 and 6 served as controls and were not centrifugally processed. Rotation of the container, which was oriented vertically, directed the reactants from the bottom surface of the container to regions of maximum centrifugal force along the side walls.

TABLE I

| Run | Rise Time (Minutes) | Rotational Speed of Centrifuge (RPM) | Residence Time in Centrifuge (Seconds) | Density of Foam (Lb./Cu. Ft.) | Diameter of Largest Cells (mm) |
|---|---|---|---|---|---|
| 1 | 2½ | 2250 | 0 | 1.64 | 1 |
| 2 | 2½ | 2250 | 40 | 2.07 | 3 |
| 3 | 2½ | 2250 | 60 | 2.96 | 4 |
| 4 | 2½ | 4500 | 40 | 1.86 | 5 |
| 5 | 2½ | 8000 | 40 | 1.84 | 4 |
| 6 | 1½ | 8000 | 0 | 1.52 | 1 |

TABLE I-continued

| Run | Rise Time (Minutes) | Rotational Speed of Centrifuge (RPM) | Residence Time in Centrifuge (Seconds) | Density of Foam (Lb./Cu. Ft.) | Diameter of Largest Cells (mm) |
|---|---|---|---|---|---|
| 7 | 1½ | 8000 | 6 | 2.30 | 4 |

After the reactants had been centrifugally processed the specified length of time, the resulting froth was poured into a box which served as a mold. For the control runs 1 and 6, the premixed reactants were poured directly into the mold. After the samples of polyurethane foam in the mold had risen and cured, their densities were measured. The samples were also examined to determine the diameter of the largest cells in the foam. These measurements are set forth in Table I for the individual runs.

As indicated in Table I, the use of centrifugal processing at high rotational speeds (i.e., generally greater than 1000 RPM) to form a froth from the foam-generating reactants leads to polyurethane foams characterized by increased cell diameters and to a lesser extent, to increased densities. Consequently, for a given formulation it is possible to obtain unusually large cell size in the resultant polyurethane foam by using centrifugal processing at high rotational speeds to produce the foam-forming froth. As a general rule, for a fixed rotational velocity at which the foam-generating reactants are processed, then the greater the residence time in the centrifuge the greater the diameter in the larger cells in the resultant polyurethane foam. For a fixed residence time, increasing the rotational velocity increased the density of the resultant foam and the diameter of the largest cells, up to a certain rotational velocity, above which the density and cell diameters remained roughly constant over the range of rotational velocities considered.

It should be noted, however, that certain polyurethane foam formulations, in particular, some polyester polyurethane foams, may be too sensitive to mechanical stresses to be employed in the present invention satisfactorily.

It is not intended to limit the present invention to the specific embodiments described above. For example, the process of the present invention can be used with rigid or semirigid polyurethane foams or other types of polymeric foam which are prepared and cast in a manner similar to polyurethane foam. It will also be recognized, for example, that a rigid conduit which pivots about an axis can be used in place of the flexible conduit 68 of FIG. 2. It is recognized that these other changes may be made in the processes and apparatus specifically described herein without departing from the scope and teachings of the instant invention, and it is intended to encompass all other embodiments, alternatives and modifications consistent with the present invention.

I claim:

1. A process for producing polyurethane foam comprising the steps of:
   (a) preparing a liquid mixture of polyurethane foam generating reactants;
   (b) centrifugally processing the liquid mixture of reactants in a substantially axially symmetric centrifuge, which centrifuge comprises a rotatable container having a side wall and a first end wall, the container being rotatable about its axis, the first end wall having an opeining therethrough concentric of the axis for discharging from the interior of the container the more viscous, partially-expanded, less dense prefoamed fluid mixture, and the interior of the container being clear of non-rotatable obstructions which would collide with the rotating mixture obtained from the reactants when the centrifuge is in operation, to impel the liquid mixture against the radial inner side wall of the centrifuge and form a more viscous, partially-expanded less dense prefoamed fluid mixture from the liquid mixture of polyurethane foam-generating reactants, and
   (c) then removing the more viscous, partially-expanded prefoamed mixture from the opening in the axial region of the centrifuge and depositing the resultant mixture on a surface to complete its rise and cure and thereby form a polyurethane foam.

2. The process of claim 1 in which the step of centrifugally processing the reactants includes the steps of:
   (b.1) rotating the centrifuge about its axis;
   (b.2) metering the reactants into the centrifuge;
   (b.3) directing the reactants to regions in the centrifuge of maximum centrifugal force;
   (b.4) generating a gas within the reactants to form a more viscous, partially-expanded less dense prefoamed fluid mixture from the liquid mixture of polyurethane foam-generating reactants;
   (b.5) expanding the more viscous, partially-expanded prefoamed mixture in a radial direction against the centrifugal force; and
   (b.6) withdrawing the more viscous, partially-expanded prefoamed mixture from the centrifuge from a region in the centrifuge separated from regions of maximum centrifugal force.

3. The process of claim 1, wherein the step of depositing the resultant mixture on a surface to complete its rise and cure includes depositing the mixture in a mold.

4. The process of claim 1, in which the reactants are polyether polyurethane-foam-generating reactants.

5. The process of claim 1 in which the steps are carried out substantially continuously.

6. The process of claim 1, in which the steps are carried out sequentially.

7. A process for centrifugally processing liquid polyurethane-generating reactants comprising the steps of:
   (a) rotating a centrifuge, which centrifuge comprises a rotatable container having a side wall and a first end wall, the container being rotatable about its axis, the first end wall having an opening therethrough concentric of the axis for discharging from the interior of the container the more viscous, partially-expanded, less dense prefoamed fluid mixture, and the interior of the container being clear of non-rotatable obstructions which would collide with the rotating mixture obtained from the reactants when the centrifuge is in operation, about its axis;
   (b) metering the reactants into the centrifuge;

(c) directing the reactants to regions in the centrifuge of maximum centrifugal force;

(d) generating gas within the reactants to form a more viscous, partially-expanded prefoamed mixture;

(e) expanding the more viscous, partially-expanded prefoamed mixture in a generally radial direction against the centrifugal force; and (f) withdrawing the more viscous, partially-expanded prefoamed mixture from the centrifuge from a region in the centrifuge separated from regions of maximum centrifugal force.

8. The process of claim 7, in which the reactants are polyether polyurethane-foam-generating reactants.

9. The process according to claim 7, in which the steps are carried out substantially continuously.

10. The process according to claim 7, further comprising the step of:

(g) maintaining the pressure in the centrifuge at a pressure greater than ambient atmospheric pressure.

11. The process of claim 1 in which the centrifugally processing of the liquid mixture of reactants is accomplished around the substantially vertical axis of the centrifuge.

12. The process of claim 1 in which the more viscous, partially-expanded prefoamed mixture is removed from the bottom of the centrifuge.

13. The process of claim 1 in which the centrifugally processing of the liquid mixture of reactants is accomplished at high rotational speeds greater than about 1,000 RPMs whereby the polyurethane foam obtained is characterized by increased cell diameter and/or increased density.

* * * * *

UNITED STATES PATENT AND TRADEMARK OFFICE
CERTIFICATE OF CORRECTION

PATENT NO. : 4,158,032
DATED : June 12, 1979
INVENTOR(S) : Derk J. Boon

It is certified that error appears in the above-identified patent and that said Letters Patent are hereby corrected as shown below:

Column 8, line 16, "second moldside liner" should read --second mold-side liner--.

Column 9, line 1, "centrifugue" should read --centrifuge--.

Column 9, line 3, "long 1 inch" should read --long and 1 inch--.

Column 10, line 23, "Chemical Co.)" should read --(Dow Chemical Co.)--.

Column 10, line 67, "52 1/2  8000  40  1.84  4" should read --5  2 1/2  8000  40  1.84  4--.

Signed and Sealed this

Ninth Day of October 1979

[SEAL]

Attest:

RUTH C. MASON
Attesting Officer

LUTRELLE F. PARKER
Acting Commissioner of Patents and Trademarks